United States Patent
Ye et al.

(10) Patent No.: US 12,218,608 B2
(45) Date of Patent: Feb. 4, 2025

(54) THREE-LEVEL POWER CONVERTER AND CONTROL METHOD

(71) Applicant: Huawei Digital Power Technologies Co., Ltd., Shenzhen (CN)

(72) Inventors: Liming Ye, Plano, TX (US); Heping Dai, Plano, TX (US); Ning Wang, Shenzhen (CN); Gang Ye, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 17/685,702

(22) Filed: Mar. 3, 2022

(65) Prior Publication Data
US 2022/0393578 A1    Dec. 8, 2022

Related U.S. Application Data

(63) Continuation of application No. PCT/US2019/050545, filed on Sep. 11, 2019.

(51) Int. Cl.
*H02M 7/483*    (2007.01)
*H02M 1/00*    (2007.01)
*H02M 3/07*    (2006.01)

(52) U.S. Cl.
CPC ......... *H02M 7/483* (2013.01); *H02M 1/0095* (2021.05); *H02M 3/07* (2013.01); *H02M 7/4833* (2021.05)

(58) Field of Classification Search
CPC ..... H02M 3/07; H02M 1/0095; H02M 7/4833
See application file for complete search history.

(56) References Cited

U.S. PATENT DOCUMENTS

| | | | |
|---|---|---|---|
| 9,866,113 B1* | 1/2018 | Assaad | H02M 3/158 |
| 10,536,073 B2* | 1/2020 | Young | H02M 7/10 |
| 2009/0146588 A1* | 6/2009 | Okamura | H02M 3/156 323/305 |
| 2012/0044722 A1* | 2/2012 | Cuk | H02M 3/335 363/21.03 |
| 2014/0001856 A1* | 1/2014 | Agamy | H02M 3/155 307/43 |
| 2015/0077080 A1* | 3/2015 | Chen | H02M 3/156 323/282 |
| 2016/0329810 A1* | 11/2016 | Lee | H02M 3/07 |
| 2017/0055322 A1* | 2/2017 | Jiang | H02M 3/07 |
| 2017/0104423 A1* | 4/2017 | Wu | H02M 7/493 |
| 2020/0007050 A1* | 1/2020 | Fu | H02M 7/4837 |
| 2021/0152100 A1* | 5/2021 | Zilio | H02M 7/4837 |

FOREIGN PATENT DOCUMENTS

| | | |
|---|---|---|
| CN | 106026736 A | 10/2016 |
| CN | 106100346 A | 11/2016 |
| CN | 106505866 A | 3/2017 |

(Continued)

*Primary Examiner* — Gustavo A Rosario-Benitez
(74) *Attorney, Agent, or Firm* — Slater Matsil, LLP

(57) ABSTRACT

A method includes detecting a voltage signal of a three-level power converter, the voltage signal indicative of a capacitor voltage balancing in the three-level power converter, and dynamically adjusting an operating variable to adjust the voltage signal until the capacitor voltage balancing in the three-level power converter satisfies a criteria.

20 Claims, 9 Drawing Sheets

(56) References Cited

FOREIGN PATENT DOCUMENTS

| | | |
|---|---|---|
| CN | 107181407 A | 9/2017 |
| CN | 107579666 A | 1/2018 |
| CN | 109687704 A | 4/2019 |
| EP | 3236576 A1 | 10/2017 |
| JP | 2013055830 A | 3/2013 |
| WO | 2017156638 A1 | 9/2017 |

* cited by examiner

THREE-LEVEL POWER CONVERTER AND CONTROL METHOD

CROSS-REFERENCE TO RELATED APPLICATIONS

This application is a continuation of Application No. PCT/US2019/050545, filed on Sep. 11, 2019, which application is hereby incorporated herein by reference in its entirety.

TECHNICAL FIELD

The present disclosure relates to a control method for achieving a capacitor voltage balancing in a multilevel power converter, and, in particular embodiments, to a control method for achieving a capacitor voltage balancing in a three-level power converter.

BACKGROUND

As technologies further advance, a variety of electronic devices, such as mobile phones, tablet PCs, digital cameras, MP3 players and/or the like, have become popular. Each electronic device requires direct current (DC) power at a substantially constant voltage which may be regulated within a specified range even when the current drawn by the electronic device may vary over a wide range. When an input voltage is lower than the specific range, a step-up DC/DC converter may be employed to convert the input voltage into a regulated voltage within the specific range. On the other hand, when the input voltage is higher than the specific range, a step-down DC/DC converter may be used to convert the voltage of the input power source into a lower voltage to satisfy the operational voltage to which the electronic circuit is specified.

There may be a variety of DC/DC conversion topologies. In accordance with the topology difference, DC/DC converters can be divided into three categories, namely, switching DC/DC converters, linear regulators and switched-capacitor converters. In accordance with the voltage level difference, DC/DC converters can be divided into two categories, namely, two-level power converters and three-level power converters. Switched-capacitor converters are one type of three-level power converters.

As integrated circuits become increasingly advanced while shrinking in size at the same time, a compact and high efficiency DC/DC conversion topology is desirable. In comparison with other topologies, three-level power converters such as switched-capacitor converters are less complicated because the switched-capacitor converters are formed by a plurality of switches and a flying capacitor. In addition, the switched-capacitor converters have a small footprint and are capable of generating a high efficient power conversion by switching the flying capacitor between a charging phase and a discharging phase. As a result, the switched-capacitor converters can provide compact and efficient power for integrated circuits.

In a three-level power converter with a flying capacitor, it is essential to maintain a voltage balancing for the flying capacitor in order to keep the three-level power converter operating efficiently and safely as intended. Voltage unbalance on the flying capacitor can be caused by many factors such as operating condition changes (e.g., startup, input or output voltage changes, load changes or transients, etc.), circuit asymmetries, component variations, tolerances, unmatched pulse width modulation (PWM) signals or gate drives, any combinations thereof and the like.

Unbalanced capacitor voltages not only lead to unsymmetrical circuit operations, which may lower the power efficiency of the three-level power converter, but also cause extra overvoltage stresses on the power switches and capacitors, which may result in component and system failures. In some applications with an input voltage varying in a wide range, it would be desirable to achieve a capacitor voltage balancing so as to reduce the voltage stresses on the power switches and capacitors.

SUMMARY

These and other problems are generally solved or circumvented, and technical advantages are generally achieved, by preferred embodiments of the present disclosure which provide a control mechanism for achieving a capacitor voltage balancing in a three-level power converter.

In accordance with an embodiment, a method comprises detecting a voltage signal of a three-level power converter, the voltage signal indicative of a capacitor voltage balancing in the three-level power converter, and dynamically adjusting an operating variable to adjust the voltage signal until the capacitor voltage balancing in the three-level power converter satisfies a criteria.

The three-level power converter includes a first switch, a second switch, a third switch and a fourth switch connected in series between an input voltage bus and ground, a flying capacitor connected between a common node of the first switch and the second switch, and a common node of the third switch and the fourth switch, and an output filter connected between a common node of the second switch and the third switch, and ground.

The voltage signal is a voltage across the flying capacitor, and the operating variable is a duty cycle of the second switch.

The method further comprises determining a duty cycle through a main control loop, determining a duty cycle variation through a local control loop, and configuring the first switch to operate with the duty cycle, and configuring the second switch to operate with a sum of the duty cycle and the duty cycle variation.

The operating variable is an adjustable delay between a gate drive signal of the first switch and a gate drive signal of the second switch, and wherein the adjustable delay is obtained through a negative feedback loop.

The three-level power converter includes a first switch, a second switch, a third switch and a fourth switch connected in series between an input voltage bus and ground, a first input capacitor and a second input capacitor connected in series between the input voltage bus and ground, a common node of the first input capacitor and the second input capacitor being connected to a common node of the second switch and the third switch, and an output filter connected between a common node of the first switch and the second switch, and a common node of the third switch and the fourth switch.

The output filter includes an inductor and a capacitor connected in series between the common node of the first switch and the second switch, and the common node of the third switch and the fourth switch.

The voltage signal is a voltage at the common node of the second switch and the third switch, and the operating variable is a duty cycle of the fourth switch.

The method further comprises determining a duty cycle through a main control loop, determining a duty cycle variation through a local control loop, and configuring the first switch to operate with the duty cycle, and configuring the fourth switch to operate with a sum of the duty cycle and the duty cycle variation.

The operating variable is an adjustable delay placed between a gate drive signal of the first switch and a gate drive signal of the fourth switch, and wherein the adjustable delay is obtained through a negative feedback loop.

In accordance with another embodiment, an apparatus comprises a multilevel power converter including a plurality of switches connected in series between an input voltage bus and ground, and a controller configured to generate gate drive signals for the plurality of switches, wherein the gate drive signals are dynamically adjusted to achieve a capacitor voltage balancing in the multilevel power converter.

The multilevel power converter includes a first switch, a second switch, a third switch and a fourth switch connected in series between the input voltage bus and ground, a flying capacitor connected between a common node of the first switch and the second switch, and a common node of the third switch and the fourth switch, the gate drive signals being dynamically adjusted to maintain a voltage across the flying capacitor equal to one half of a voltage on the input voltage bus, and a filter connected between a common node of the second switch and the third switch, and ground.

The multilevel power converter includes a first switch, a second switch, a third switch and a fourth switch connected in series between the input voltage bus and ground, a first input capacitor and a second input capacitor connected in series between the input voltage bus and ground, a common node of the first input capacitor and the second input capacitor being connected to a common node of the second switch and the third switch, the gate drive signals being dynamically adjusted to maintain a voltage at the common node of the first input capacitor and the second input capacitor equal to one half of a voltage on the input voltage bus, and a filter connected between a common node of the first switch and the second switch, and a common node of the third switch and the fourth switch.

In accordance with yet another embodiment, a method comprises determining a first duty cycle of a three-level power converter through a main control loop, and based on the first duty cycle, determining a second duty cycle of the three-level power converter through a local control loop, the local control loop being configured such that the three-level power converter achieves a capacitor voltage balancing through adjusting the second duty cycle.

The three-level power converter includes a first switch, a second switch, a third switch and a fourth switch connected in series between an input voltage bus and ground, a flying capacitor connected between a common node of the first switch and the second switch, and a common node of the third switch and the fourth switch, and a filter connected between a common node of the second switch and the third switch, and ground.

The method further comprises applying the first duty cycle to the first switch, and applying the second duty cycle to the second switch, a voltage across the flying capacitor being dynamically adjusted through adjusting the second duty cycle using the local control loop.

The method further comprises dynamically adjusting a voltage across the flying capacitor through applying an adjustable delay placed between a gate drive signal of the first switch and a gate drive signal of the second switch, wherein the adjustable delay is obtained through a negative feedback loop.

The three-level power converter includes a first switch, a second switch, a third switch and a fourth switch connected in series between an input voltage bus and ground, a first input capacitor and a second input capacitor connected in series between the input voltage bus and ground, a common node of the first input capacitor and the second input capacitor being connected to a common node of the second switch and the third switch, and a filter connected between a common node of the first switch and the second switch, and a common node of the third switch and the fourth switch.

The method further comprises applying the first duty cycle to the first switch, and applying the second duty cycle to the fourth switch, a voltage on a common node of the first input capacitor and the second input capacitor being dynamically adjusted through adjusting the second duty cycle using the local control loop.

The method further comprises dynamically adjusting a voltage on a common node of the first input capacitor and the second input capacitor through applying an adjustable delay placed between a gate drive signal of the first switch and a gate drive signal of the fourth switch, wherein the adjustable delay is obtained through a negative feedback loop.

An advantage of an embodiment of the present disclosure is achieving a capacitor voltage balancing in a three-level power converter, thereby improving the efficiency, reliability and cost of the three-level power converter.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a control method for achieving a capacitor voltage balancing in a three-level power converter. The present disclosure may also be applied, however, to a variety of multilevel power converters. Hereinafter, various embodiments will be explained in detail with reference to the accompanying drawings.

Figure 1:
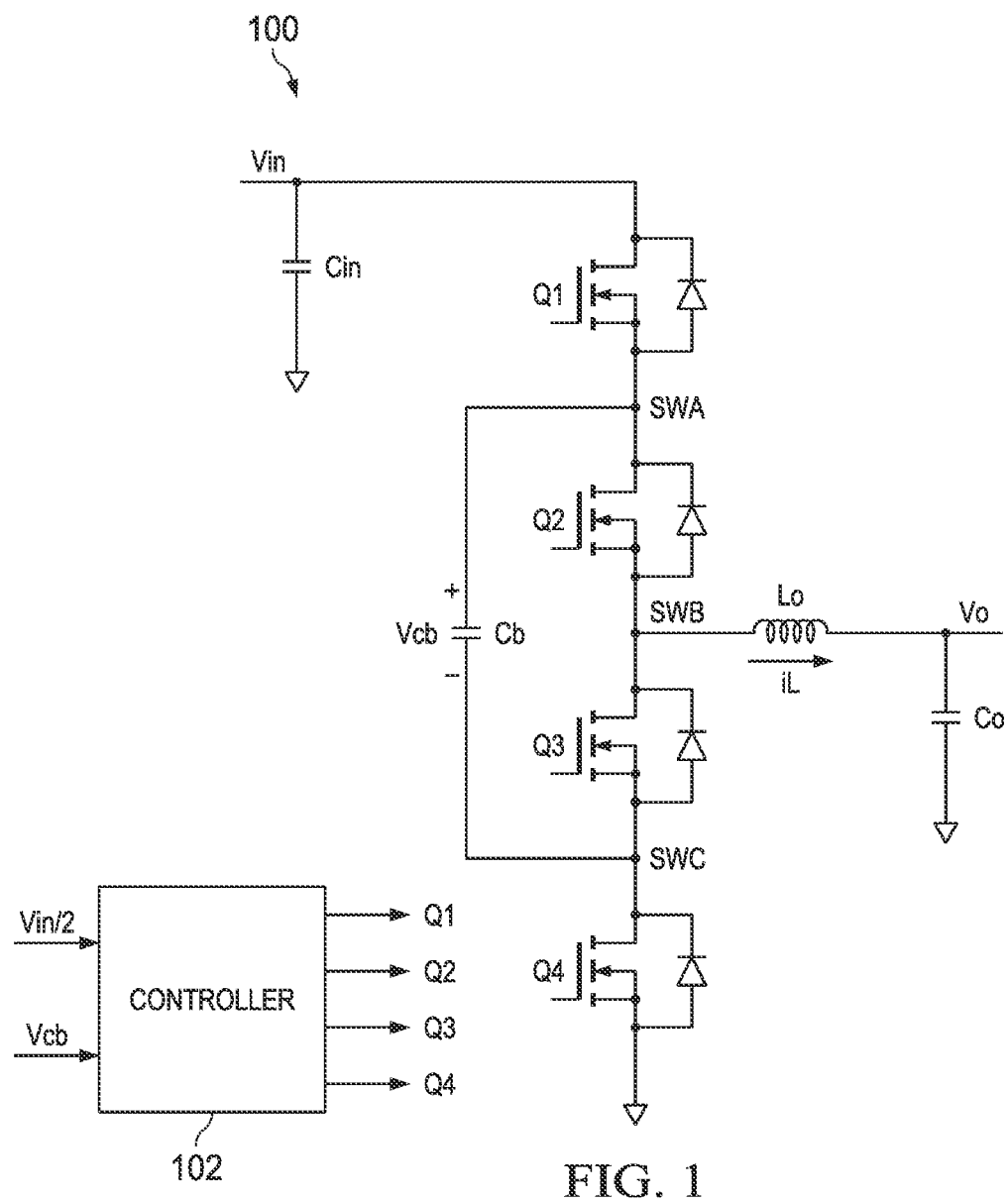
FIG. 1 illustrates a schematic diagram of a first three-level power converter in accordance with various embodiments of the present disclosure.

FIG. 1 illustrates a schematic diagram of a first three-level power converter in accordance with various embodiments of the present disclosure. The first three-level power converter 100 comprises an input capacitor Cin, a first switch Q1, a second switch Q2, a third switch Q3, a fourth switch Q4, a capacitor Cb, an output inductor Lo and an output capacitor Co. As shown in FIG. 1, the output inductor Lo and the output capacitor Co form an output filter. The common node of the output inductor Lo and the output capacitor Co is the output terminal (Vo) of the first three-level power converter 100.

Figure 2:
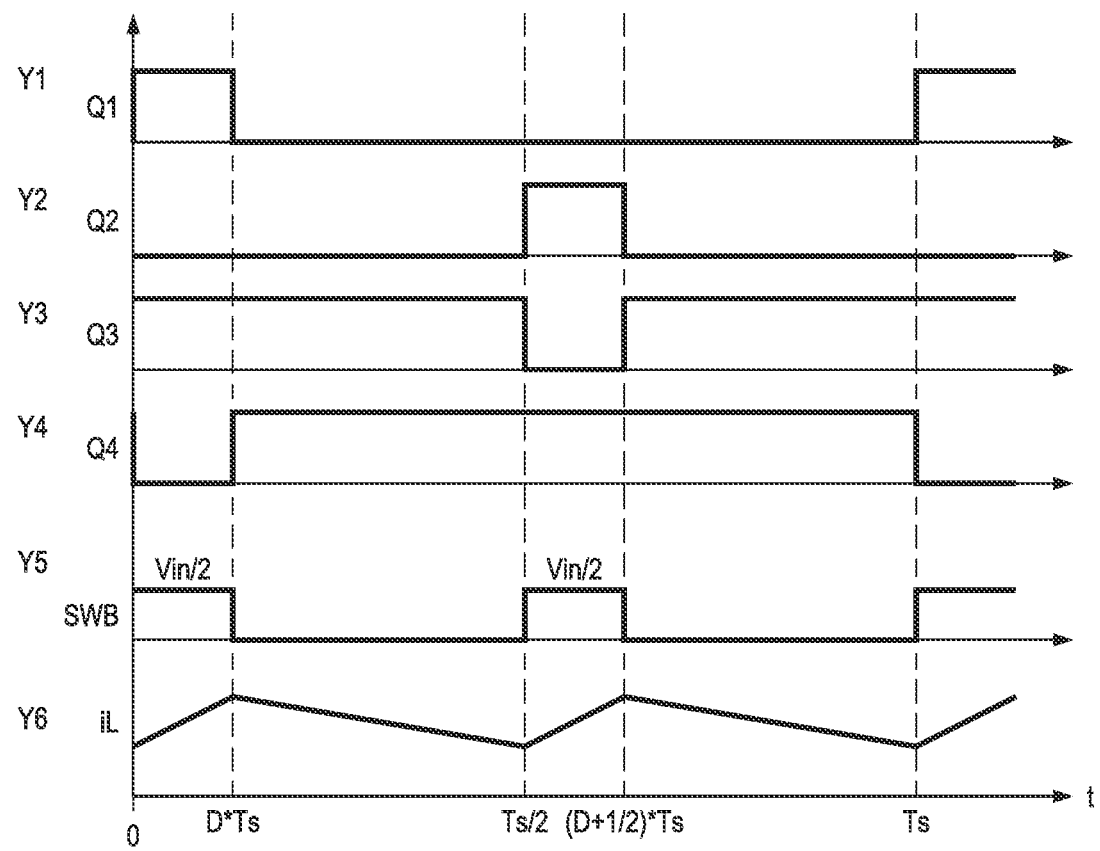
FIG. 2 illustrates a PWM control timing diagram of the low duty cycle mode of the first three-level power converter in accordance with various embodiments of the present disclosure.

The first switch Q1, the second switch Q2, the third switch Q3 and the fourth switch Q4 are connected in series between an input voltage source Vin and ground. Throughout the description, the positive terminal of the input voltage source Vin is alternatively referred to as an input voltage bus. A common node of the first switch Q1 and the second switch Q2 is denoted as SWA as shown in FIG. 2. Likewise, a common node of the second switch Q2 and the third switch Q3 is denoted as SWB. A common node of the third switch Q3 and the fourth switch Q4 is denoted as SWC. As shown in FIG. 1, the capacitor Cb is connected between SWA and SWC.

In some embodiments, the capacitor Cb functions as a flying capacitor. Throughout the description, the capacitor Cb is alternatively referred to as the flying capacitor Cb.

In accordance with an embodiment, the switches (e.g., switches Q1-Q4) may be metal oxide semiconductor field-effect transistor (MOSFET) devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted while FIG. 1 shows the switches Q1-Q4 are implemented as single n-type transistors, a person skilled in the art would recognize there may be many variations, modifications and alternatives. For example, depending on different applications and design needs, the switches Q1-Q4 may be implemented as p-type transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

The first three-level power converter 100 includes two different operating modes, namely a low duty cycle mode, and a high duty cycle mode. The duty cycle of the first three-level power converter 100 is the duty cycle of the first switch Q1. The duty cycle of Q2 is equal to the duty cycle of Q1. There is a 180 degree phase shift between the leading edge of the gate drive signal of Q1 and the leading edge of the gate drive signal of Q2. The gate drive signal of Q4 is complementary to the gate drive signal Q1. The gate drive signal of Q3 is complementary to the gate drive signal Q2.

In some embodiments, when the first three-level power converter 100 operates in the low duty cycle mode, the duty cycle of the first three-level power converter 100 is in a range from 0 to 50%. On the other hand, when the first three-level power converter 100 operates in the high duty cycle mode, the duty cycle of the first three-level power converter 100 is in a range from 50% to 100%. The detailed operating principles of the low duty cycle mode and the high duty cycle mode of the first three-level power converter 100 will be described below with respect to FIGS. 2-3, respectively.

FIG. 1 further illustrates a controller 102. The controller 102 may be implemented as any suitable controllers such as a microprocessor and the like. The controller 102 detects various operating parameters (e.g., the input voltage Vin, the output voltage Vo, the voltage across the flying capacitor Cb, the load current, any combinations thereof and the like). Based upon the detected operating parameters, the controller 102 determines the gate drive signals of switches Q1-Q4 as shown in FIG. 1.

In some embodiments, the controller 102 is configured to detect the input voltage Vin. More particularly, the controller 102 is configured to detect the voltage level of one half of the input voltage (Vin/2). This voltage level (Vin/2) can be obtained through a suitable sensing apparatus. For example, this voltage level (Vin/2) can be obtained through a resistor divider connected between the input voltage bus Vin and ground. The controller 102 is also configured to detect the voltage across the flying capacitor Cb. Based on the detected voltage signals Vin/2 and Vcb, the controller 102 determines the gate drive signals of switches Q1, Q2, Q3 and Q4 accordingly. The detailed operating principle of the controller 102 will be described below with respect to FIGS. 2-4.

FIG. 2 illustrates a PWM control timing diagram of the low duty cycle mode of the first three-level power converter in accordance with various embodiments of the present disclosure. The horizontal axis of FIG. 2 represents intervals of time. There are six vertical axes. The first vertical axis Y1 represents the gate drive signal of the first switch Q1. The second vertical axis Y2 represents the gate drive signal of the second switch Q2. The third vertical axis Y3 represents the gate drive signal of the third switch Q3. The four vertical axis Y4 represents the gate drive signal of the fourth switch Q4. The fifth vertical axis Y5 represents the voltage on the node SWB. The sixth vertical axis Y6 represents the current flowing through the inductor Lo.

One switching cycle of the first three-level power converter 100 can be divided into four phases as shown in FIG. 2. A first phase is from 0 to D·Ts where D and Ts are the duty cycle and the switching cycle of the first three-level power converter 100, respectively. A second phase is from D·Ts to Ts/2. A third phase is from Ts/2 to (Ts/2+D·Ts). A fourth phase is from (Ts/2+D·Ts) to Ts.

As shown in FIG. 2, the duty cycle of the first switch Q1 is equal to the duty cycle of the second switch Q2. The duty cycle of the first switch Q1 is in a range from 0 to 50%. In some embodiments, D is equal to a ratio of the output voltage Vo to the input voltage Vin. The gate drive signal of the fourth switch Q4 is complementary to the gate drive signal of the first switch Q1. The gate drive signal of the fourth switch Q3 is complementary to the gate drive signal of the first switch Q2. As shown in FIG. 2, there is a delay between a leading edge of the gate drive signal of the first switch Q1 and a leading edge of the gate drive signal of the second switch Q2. The delay is equal to one half of the switching cycle. Likewise, the delay between a leading edge of the gate drive signal of the fourth switch Q4 and a leading edge of the gate drive signal of the third switch Q3 is equal to one half of the switching cycle.

During the first phase, switches Q2 and Q4 are turned off. Switches Q1 and Q3 are turned on as shown in FIG. 2. As a result of turning on switches Q1 and Q3, a conductive path is established between Vin and Vo. The conductive path is formed by switch Q1, the flying capacitor Cb, switch Q3 and output inductor Lo. The current flows from the input power source Vin to the output voltage Vo through the conductive path. The voltage on the node SWB is equal to Vin/2 as shown in FIG. 2.

During the first phase, the flying capacitor Cb is charged and energy is stored in the flying capacitor Cb accordingly. The current flowing through the inductor Lo may ramp up or down depending on the voltage applied across the inductor Lo. In some embodiments, when the input voltage Vin is greater than the sum of the voltage across the flying capacitor Cb and the output voltage Vo, the current flowing through the inductor Lo ramps up and the energy stored in the inductor Lo increases accordingly. The current slope S of the inductor Lo satisfies the following equation:

$$S=(Vin-Vcb-Vo)/Lo \quad (1)$$

where Vcb is the voltage across the flying capacitor Cb.

During the second phase, switches Q1 and Q2 are turned off. Switches Q3 and Q4 are turned on. As a result of turning on switches Q3 and Q4, a conductive path is established between Vo and ground. The conductive path is formed by switch Q4, switch Q3 and output inductor Lo. In some embodiments, switch Q4 provides a freewheeling path for the current flowing through the output inductor Lo. The voltage on the node SWB is equal to zero as shown in FIG. 2.

During the second phase, the flying capacitor Cb is isolated by the turned-off switches Q1 and Q2. The current flowing through the inductor Lo ramps down and the energy stored in the inductor Lo decreases accordingly. The current slope S of the inductor Lo satisfies the following equation:

$$S=-Vo/Lo \quad (2)$$

During the third phase, switches Q1 and Q3 are turned off. Switches Q2 and Q4 are turned on. As a result of turning on switches Q2 and Q4, a conductive path is established between Vo and ground. The conductive path is formed by switch Q4, the flying capacitor Cb, switch Q2 and output inductor Lo. The voltage on the node SWB is equal to Vin/2 as shown in FIG. 2.

During the third phase, the current discharges the flying capacitor Cb and the energy stored in the flying capacitor Cb decreases accordingly. In some embodiments, the current flowing through the inductor Lo may ramp up and the energy stored in the inductor Lo increases accordingly. In the third phase, the current slope S of the inductor Lo satisfies the following equation:

$$S=(Vcb-Vo)/Lo \quad (3)$$

During the fourth phase, switches Q1 and Q2 are turned off. Switches Q3 and Q4 are turned on. As a result of turning on switches Q3 and Q4, a conductive path is established between Vo and ground. The conductive path is formed by switch Q4, switch Q3 and output inductor Lo. In some embodiments, switch Q4 provides a freewheeling path for the current flowing through the output inductor Lo. The voltage on the node SWB is equal to zero as shown in FIG. 2.

During the fourth phase, the flying capacitor Cb is isolated by the turned-off switches Q1 and Q2. The current flowing through the inductor Lo ramps down and the energy stored in the inductor Lo decreases accordingly. In the fourth phase, the current slope S of the inductor Lo satisfies the following equation:

$$S=-Vo/Lo \quad (4)$$

Figure 3:
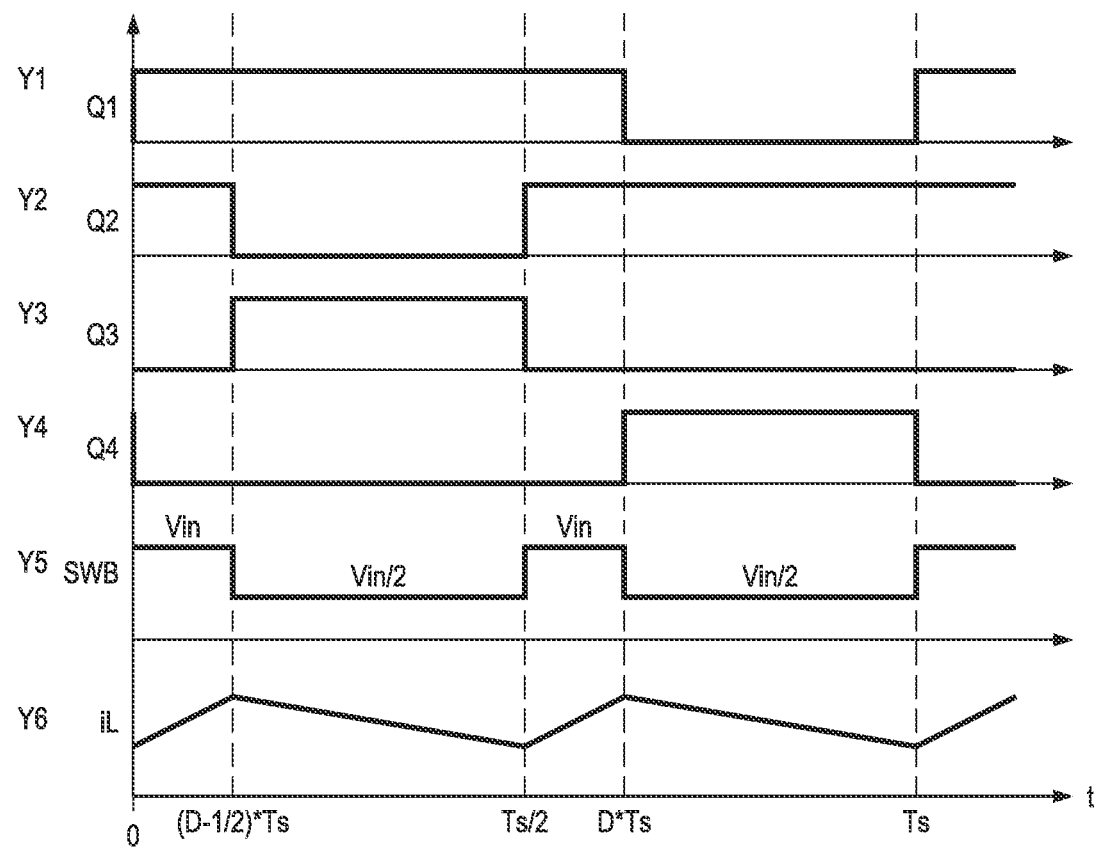
FIG. 3 illustrates a PWM control timing diagram of the high duty cycle mode of the first three-level power converter in accordance with various embodiments of the present disclosure.

FIG. 3 illustrates a PWM control timing diagram of the high duty cycle mode of the first three-level power converter in accordance with various embodiments of the present disclosure. The horizontal axis of FIG. 3 represents intervals of time. There are six vertical axes. The first vertical axis Y1 represents the gate drive signal of the first switch Q1. The second vertical axis Y2 represents the gate drive signal of the second switch Q2. The third vertical axis Y3 represents the gate drive signal of the third switch Q3. The four vertical axis Y4 represents the gate drive signal of the fourth switch Q4. The fifth vertical axis Y5 represents the voltage on the node SWB. The sixth vertical axis Y6 represents the current flowing through the inductor Lo.

One switching cycle of the first three-level power converter 100 can be divided into four phases as shown in FIG. 3. A first phase is from 0 to (D·Ts−Ts/2). A second phase is from (D·Ts−Ts/2) to Ts/2. A third phase is from Ts/2 to D·Ts. A fourth phase is from D·Ts to Ts.

As shown in FIG. 3, the duty cycle of the first switch Q1 is equal to the duty cycle of the second switch Q2. The duty cycle of the first switch Q1 is in a range from 50% to 100%. In some embodiments, D is equal to a ratio of the output voltage Vo to the input voltage Vin. The gate drive signal of the fourth switch Q4 is complementary to the gate drive signal of the first switch Q1. The gate drive signal of the fourth switch Q3 is complementary to the gate drive signal of the first switch Q2. As shown in FIG. 3, there is a delay between a leading edge of the gate drive signal of the first switch Q1 and a leading edge of the gate drive signal of the second switch Q2. The delay is equal to one half of the switching cycle. Likewise, the delay between a leading edge of the gate drive signal of the third switch Q3 and a leading edge of the gate drive signal of the fourth switch Q4 is equal to one half of the switching cycle.

During the first phase, switches Q3 and Q4 are turned off. Switches Q1 and Q2 are turned on as shown in FIG. 3. As a result of turning on switches Q1 and Q2, a conductive path is established between Vin and Vo. The conductive path is formed by switch Q1, switch Q2 and the output inductor Lo. The current flows from the input power source Vin to the output voltage Vo through the conductive path. The voltage on the node SWB is equal to Vin as shown in FIG. 3.

During the first phase, the current flowing through the inductor Lo may ramp up, and the energy stored in the inductor Lo increases accordingly. The current slope S of the inductor Lo satisfies the following equation:

$$S=(Vin-Vo)/Lo \qquad (5)$$

During the second phase, switches Q2 and Q4 are turned off. Switches Q1 and Q3 are turned on as shown in FIG. 3. As a result of turning on switches Q1 and Q3, a conductive path is established between Vin and Vo. The conductive path is formed by switch Q1, the flying capacitor Cb, switch Q3 and the output inductor Lo. The current flows from the input power source Vin to the output voltage Vo through the conductive path. The voltage on the node SWB is equal to Vin/2 as shown in FIG. 3.

During the second phase, the flying capacitor Cb is charged and energy is stored in the flying capacitor Cb accordingly. The current flowing through the inductor Lo may ramp up or down depending on the voltage applied across the inductor Lo. In some embodiments, when the input voltage Vin is less than the sum of the voltage across the flying capacitor Cb and the output voltage Vo, the current flowing through the inductor Lo ramps down, and the energy stored in the inductor Lo reduces accordingly. The current slope S of the inductor Lo satisfies the following equation:

$$S=(Vin-Vcb-Vo)/Lo \qquad (6)$$

During the third phase, switches Q3 and Q4 are turned off. Switches Q1 and Q2 are turned on as shown in FIG. 3. As a result of turning on switches Q1 and Q2, a conductive path is established between Vin and Vo. The conductive path is formed by switch Q1, switch Q2 and the output inductor Lo. The current flows from the input power source Vin to the output voltage Vo through the conductive path. The voltage on the node SWB is equal to Vin as shown in FIG. 3.

During the third phase, the current flowing through the inductor Lo may ramp up, and the energy stored in the inductor Lo increases accordingly. The current slope S of the inductor Lo satisfies the following equation:

$$S=(Vin-Vo)/Lo \qquad (7)$$

During the fourth phase, switches Q1 and Q3 are turned off. Switches Q2 and Q4 are turned on. As a result of turning on switches Q2 and Q4, a conductive path is established between Vo and ground. The conductive path is formed by switch Q4, the flying capacitor Cb, switch Q2 and output inductor Lo. The voltage on the node SWB is equal to Vin/2 as shown in FIG. 3.

During the fourth phase, the current discharges the flying capacitor Cb and the energy stored in the flying capacitor Cb decreases accordingly. In some embodiments, the current flowing through the inductor Lo may ramp down, and the energy stored in the inductor Lo decreases accordingly. In the fourth phase, the current slope S of the inductor Lo satisfies the following equation:

$$S=(Vcb-Vo)/Lo \qquad (8)$$

In the first three-level power converter 100, it is desirable to maintain a voltage balancing. In particular, the controller 102 shown in FIG. 1 is configured to control the operation of the first three-level power converter 100 so as to maintain the voltage across the flying capacitor Cb equal to one half of the input voltage Vin. Such a voltage balancing helps to keep the first three-level power converter 100 operating efficiently and safely as intended.

In operation, the controller 102 determines the duty cycle of the first three-level power converter 100 through a main feedback control loop. The duty cycle is applied to switch Q1 directly. In order to achieve a capacitor voltage balancing, a duty cycle variation is obtained through a local feedback control loop. The sum of the duty cycle from the main feedback control loop and the duty cycle variation from the local feedback control loop is applied to switch Q2. The duty cycle variation helps to maintain the voltage across the flying capacitor Cb equal to one half of the input voltage Vin. The detailed operating principle of this capacitor voltage balancing control method will be described below with respect to FIG. 4.

Figure 4:
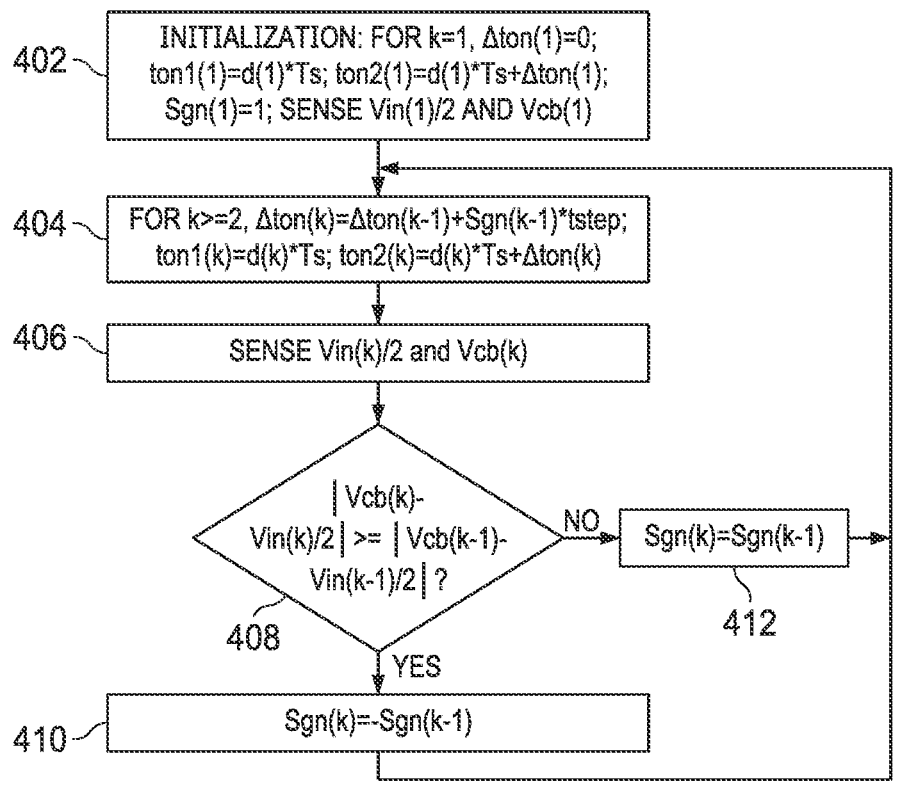
FIG. 4 illustrates a flow chart of a method for controlling the first three-level power converter shown in FIG. 1 in accordance with various embodiments of the present disclosure.

FIG. 4 illustrates a flow chart of a method for controlling the first three-level power converter shown in FIG. 1 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

In order to achieve a capacitor voltage balancing, a try-and-error based control method is applied to the first three-level power converter 100 shown in FIG. 1. By using the try-and-error based control method, the turn-on time of one switch (e.g., the second switch Q2) is dynamically adjusted so as to balance the voltage across the flying capacitor Cb.

The first three-level power converter 100 is controlled by a main control loop (not shown). The main control loop is configured such that an appropriate duty cycle is determined so as to regulate an output voltage and/or current of the first three-level power converter 100. The try-and-error based control method shown in FIG. 4 functions as a local control loop. The local control loop is configured such that the duty cycle generated by the main control loop is modified based on the voltage across the flying capacitor Cb. Through modifying the duty cycle, the voltage across the flying capacitor can be dynamically adjusted so as to achieve a capacitor voltage balancing.

At step 402, an initialization process is applied to the first three-level power converter. As a first step of adjusting the voltage across the flying capacitor, the controller sets k equal to 1. Δton(1) is equal to zero. Δton(1) is a duty cycle variation in the first step of adjusting the voltage across the flying capacitor. In the first step, the turn-on time of the first switch Q1 is set to d(1)·Ts, wherein d(1) is the duty cycle generated by the main control loop, and Ts is a predetermined switch cycle. Also in the first step, the turn-on time of the second switch Q2 is set to the sum of d(1)·Ts and Δton(1).

In the first step, Sgn(1) is set to 1, where Sgn is a try-and-error direction indicator. Sgn can be set to 1 or −1 depending on whether the unbalanced capacitor voltage has been reduced during this try-and-error based control process. The detailed principle of determining the value of Sgn will be discussed below with respect to Steps 408-412.

In the first step, the controller is configured to detect the input voltage Vin. More particularly, the controller is configured to detect one half of the input voltage (Vin/2) through a suitable divider circuit. The sensed one half of the input voltage in the first step is defined as Vin(1)/2 as shown in FIG. 4. Furthermore, the controller is configured to detect the voltage across the flying capacitor. The sensed voltage across the flying capacitor in the first step is defined as Vcb(1) as shown in FIG. 4.

At step 404, after finishing the initialization process at step 402, the controller proceeds with step 404 in which the controller determines the duty cycle variation by the following equation:

$$\Delta ton(k)=\Delta ton(k-1)+\text{Sgn}(k-1)\times t\text{step} \quad (9)$$

where k is an integer greater than or equal to 2, and tstep is a predetermined time duration. In some embodiments, tstep is set to 4 nanoseconds.

Also at step 404, the controller determines the duty cycles of the first switch Q1 and the second switch Q2 by the following equations:

$$ton1(k)=d(k)\times Ts \quad (10)$$

$$ton2(k)=d(k)\times Ts+\Delta ton(k) \quad (11)$$

where ton1 is the turn-on time of the first switch Q1, ton2 is the turn-on time of the second switch Q2.

At step 406, the controller is configured to detect the one half of the input voltage (Vin(k)/2) and the voltage across the flying capacitor (Vcb(k)) again.

At step 408, the controller determines whether the absolute value of the difference between Vin(k)/2 and Vcb(k) is greater than or equal to the absolute value of the difference between these two values obtained from the previous step. If the absolute value of the difference between Vin(k)/2 and Vcb(k) is greater than or equal to the absolute value of the difference between these two values obtained from the previous step, the method proceeds with step 410 where Sgn(k) is set to a value equal to −1×Sgn(k−1). Otherwise, the method proceeds with step 412 where Sgn(k) is set to a value equal to Sgn(k−1). After determining the value of Sgn at step 410 or 412, the method returns to step 404 and repeats the steps 404-412 again. Through this try-and-error based control process shown in FIG. 4, the method is able to achieve a capacitor voltage balancing.

It should be noted that k (k=1, 2, 3, . . . , N−1, N, N+1, . . . ) in the control method shown in FIG. 4 may correspond to one switching cycle, or multiple switching cycles. For example, the control method shown in FIG. 4 may adjust Δton once in every switching cycle, or every other switching cycle.

It should further be noted that the control method used in the flow chart of FIG. 4 only shows the simplest case where tstep is employed to vary Δton. In some embodiments, tstep is set as a small constant such as 4 nanoseconds. The selection of this constant time step tstep needs to consider both the accuracy and the speed of the capacitor voltage control loop (the local control loop). In addition, a variable time step approach can also be used to accelerate the adjustment speed on Δton, and make the voltage across the flying capacitor to converge faster and closer to Vin/2.

It should further be noted that the on-time adjustment of the second switch Q2 is merely an example. A person skilled in the art would understand there may be many alternatives, modifications and variations. For example, the control method may adjust the on-time of Q1 and the on-time of Q2 at the same time. The on-time adjustment step (step 404) can be modified by the following equations:

$$ton1(k)=d(k)\times Ts-\Delta ton(k) \quad (12)$$

$$ton2(k)=d(k)\times Ts+\Delta ton(k) \quad (13)$$

In alternative embodiments, The on-time adjustment step (step 404) can be modified by the following equations:

$$ton1(k)=d(k)\times Ts+\Delta ton(k) \quad (14)$$

$$ton2(k)=d(k)\times Ts-\Delta ton(k) \quad (15)$$

Figure 5:
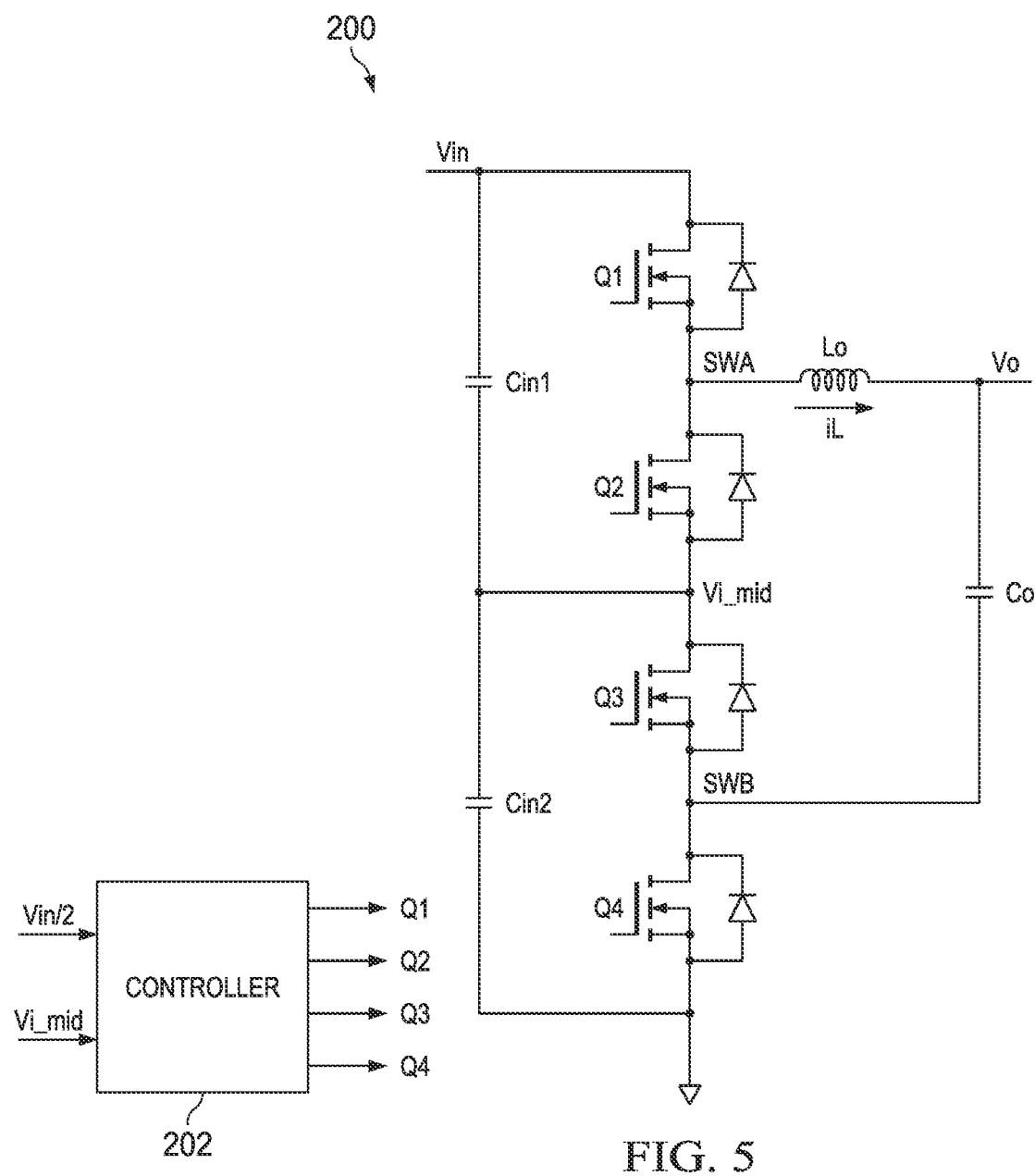
FIG. 5 illustrates a schematic diagram of a second three-level power converter in accordance with various embodiments of the present disclosure.

FIG. 5 illustrates a schematic diagram of a second three-level power converter in accordance with various embodiments of the present disclosure. The second three-level power converter 200 comprises a first switch Q1, a second switch Q2, a third switch Q3, a fourth switch Q4, a first input capacitor Cin1, a second input capacitor Cin2, an output inductor Lo and an output capacitor Co. As shown in FIG. 5, the output inductor Lo and the output capacitor Co form an output filter. The common node of the output inductor Lo and the output capacitor Co is the output terminal (Vo) of the second three-level power converter 200.

The first switch Q1, the second switch Q2, the third switch Q3 and the fourth switch Q4 are connected in series between an input voltage source Vin and ground. Throughout the description, Vin is alternatively referred to as an input voltage bus. A common node of the first switch Q1 and the second switch Q2 is denoted as SWA as shown in FIG. 5. Likewise, a common node of the second switch Q2 and the third switch Q3 is denoted as Vi_mid. A common node of the third switch Q3 and the fourth switch Q4 is denoted as SWB. As shown in FIG. 5, the output filter is connected between SWA and SWB.

The first input capacitor Cin1 and the second input capacitor Cin2 are connected in series between the input voltage source Vin and ground. A common node of the first input capacitor Cin1 and the second input capacitor Cin2 is connected to Vi_mid as shown in FIG. 5. The first input capacitor Cin1 and the second input capacitor Cin2 function as a voltage divider. The voltage at the node Vi_mid is equal to one half of the input voltage Vin. The first input capacitor Cin1 is also known as a first divider capacitor. The second input capacitor Cin2 is also known as a second divider capacitor.

In operation, a controller 202 is able to maintain the voltage across the first input capacitor Cin1 equal to the voltage across the second input capacitor Cin2. The common node of the first input capacitor Cin1 and the second input capacitor Cin2 is a midpoint of the second three-level power converter 200. Vi_mid is also known as a midpoint voltage of the second three-level power converter 200.

The second three-level power converter 200 comprises three voltage levels. A first voltage level is the voltage from the input voltage Vin. A second voltage level is equal to the voltage of Vi_mid, which is equal to one half of the input voltage Vin. A third voltage level is equal to zero.

In accordance with an embodiment, the switches (e.g., switches Q1-Q4) may be metal oxide semiconductor field-effect transistor (MOSFET) devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted while FIG. 5 shows the switches Q1-Q4 are implemented as single n-type transistors, a person skilled in the art would recognize there may be many variations, modifications and alternatives. For example, depending on different applications and design needs, the switches Q1-Q4 may be implemented as p-type transistors. Furthermore, each switch shown in FIG. 5 may be implemented as a plurality of switches connected in parallel. Moreover, a capacitor may be connected in parallel with one switch to achieve zero voltage switching (ZVS)/zero current switching (ZCS).

The second three-level power converter 200 includes two different operating modes, namely a low duty cycle mode, and a high duty cycle mode. The duty cycle of the second three-level power converter 200 is the duty cycle of the first switch Q1. The duty cycle of the fourth switch Q4 is equal to the duty cycle of the first switch Q1. There is a 180 degree phase shift between the leading edge of the gate drive signal of Q1 and the leading edge of the gate drive signal of Q4. The gate drive signal of Q2 is complementary to the gate drive signal Q1. The gate drive signal of Q3 is complementary to the gate drive signal Q4.

In some embodiments, when the second three-level power converter 200 operates in the low duty cycle mode, the duty cycle of the second three-level power converter 200 is in a range from 0 to 50%. On the other hand, when the second three-level power converter 200 operates in the high duty cycle mode, the duty cycle of the second three-level power converter 200 is in a range from 50% to 100%. The detailed operating principles of the low duty cycle mode and the high duty cycle mode will be described below with respect to FIGS. 6-7, respectively.

FIG. 5 further illustrates the controller 202. The controller 202 may be implemented as any suitable controllers such as a microprocessor and the like. The controller 202 detects various operating parameters (e.g., the input voltage Vin, the output voltage Vo, the voltage across the flying capacitor Cb, the load current, any combinations thereof and the like). Based upon the detected operating parameters, the controller 202 determines the gate drive signals of switches Q1-Q4 as shown in FIG. 5.

The controller 202 is configured to detect the in input voltage Vin. More particularly, the controller 202 is configured to detect the voltage level of one half of the input voltage (Vin/2). This voltage level (Vin/2) can be obtained through a sensing apparatus. For example, this voltage level can be obtained through a resistor divider connected between Vin and ground. The controller 202 is also configured to detect the midpoint voltage Vi_mid. Based on the detected voltage signals, the controller 202 determines the gate drive signals of switches Q1, Q2, Q3 and Q4 accordingly. The detailed operating principle of the controller 202 will be described below with respect to FIGS. 6-8.

Figure 6:
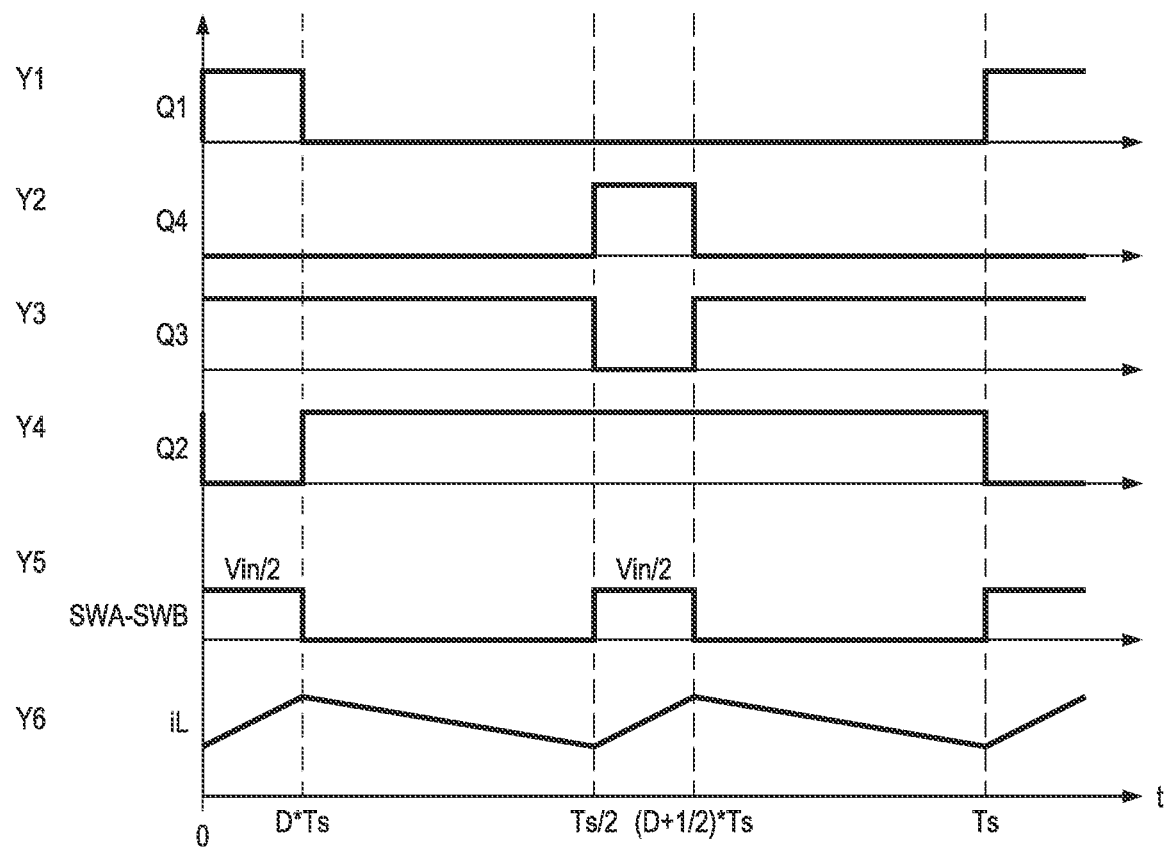
'FIG. 6 illustrates a first PWM control timing diagram applied to the second three-level power converter in accordance with various embodiments of the present disclosure.

FIG. 6 illustrates a first PWM control timing diagram applied to the second three-level power converter in accordance with various embodiments of the present disclosure. The horizontal axis of FIG. 2 represents intervals of time. There are six vertical axes. The first vertical axis Y1 represents the gate drive signal of the first switch Q1. The second vertical axis Y2 represents the gate drive signal of the fourth switch Q4. The third vertical axis Y3 represents the gate drive signal of the third switch Q3. The four vertical axis Y4 represents the gate drive signal of the second switch Q2. The fifth vertical axis Y5 represents the voltage difference between SWA and SWB. The sixth vertical axis Y6 represents the current flowing through the inductor Lo.

One switching cycle of the second three-level power converter 200 can be divided into four phases as shown in FIG. 6. A first phase is from 0 to D·Ts, where D and Ts are the duty cycle and the switching cycle of the second three-level power converter 200, respectively. A second phase is from D·Ts to Ts/2. A third phase is from Ts/2 to (Ts/2+D·Ts). A fourth phase is from (Ts/2+D·Ts) to Ts.

As shown in FIG. 6, the duty cycle of the first switch Q1 is equal to the duty cycle of the fourth switch Q4. The duty cycle of the first switch Q1 is in a range from 0 to 50%. In some embodiments, D is equal to a ratio of the output voltage Vo to the input voltage Vin. The gate drive signal of the second switch Q2 is complementary to the gate drive signal of the first switch Q1. The gate drive signal of the third switch Q3 is complementary to the gate drive signal of the fourth switch Q1. As shown in FIG. 6, there is a delay between a leading edge of the gate drive signal of the first switch Q1 and a leading edge of the gate drive signal of the fourth switch Q4. The delay is equal to one half of the switching cycle. Likewise, the delay between a leading edge of the gate drive signal of the second switch Q2 and a leading edge of the gate drive signal of the third switch Q3 is equal to one half of the switching cycle.

During the first phase, switches Q2 and Q4 are turned off. Switches Q1 and Q3 are turned on as shown in FIG. 6. As a result of turning on switches Q1 and Q3, a conductive path is established between Vin and Vi_mid. The conductive path is formed by switch Q1, output inductor Lo and switch Q3. The current flows from the input power source Vin to the output voltage Vo through the conductive path. The voltage difference between SWA and SWB is equal to Vin/2 as shown in FIG. 6.

During the first phase, the second input capacitor Cin2 is charged and the input capacitor Cin1 is discharged. The current flowing through the inductor Lo may ramp up and the energy stored in the inductor Lo increases accordingly. The current slope S of the inductor Lo satisfies the following equation:

$$S=(Vin-Vo-Vi\_mid)/Lo \qquad (16)$$

During the second phase, switches Q1 and Q4 are turned off. Switches Q2 and Q3 are turned on. As a result of turning on switches Q2 and Q3, a conductive path is established. The conductive path is formed by switch Q2, output inductor Lo, the output capacitor Co and switch Q3. In some embodiments, switches Q2 and Q3 provide a freewheeling path for the current flowing through the output inductor Lo. The voltage difference between SWA and SWB is equal to zero as shown in FIG. 6.

During the second phase, the current flowing through the inductor Lo ramps down and the energy stored in the inductor Lo decreases accordingly. The current slope S of the inductor Lo satisfies the following equation:

$$S=-Vo/Lo \qquad (17)$$

During the third phase, switches Q1 and Q3 are turned off. Switches Q2 and Q4 are turned on. As a result of turning on switches Q2 and Q4, a conductive path is established between Vi_mid and ground. The conductive path is formed by switch Q2, output inductor Lo, the output capacitor Co and switch Q4. The voltage difference between SWA and SWB is equal to Vin/2 as shown in FIG. 6.

During the third phase, the current discharges the second input capacitor Cin2 and the energy stored in the second input capacitor Cin2 decreases accordingly. In some embodiments, the current flowing through the inductor Lo may ramp up and the energy stored in the inductor Lo increases accordingly. In the third phase, the current slope S of the inductor Lo satisfies the following equation:

$$S=(V_{i\_mid}-V_o)/L_o \qquad (18)$$

During the fourth phase, switches Q1 and Q4 are turned off. Switches Q2 and Q3 are turned on. As a result of turning on switches Q2 and Q3, a conductive path is established. The conductive path is formed by switch Q2, output inductor Lo, the output capacitor Co and switch Q3. In some embodiments, switches Q2 and Q3 provide a freewheeling path for the current flowing through the output inductor Lo. The voltage difference between SWA and SWB is equal to zero as shown in FIG. 6.

During the fourth phase, the current flowing through the inductor Lo ramps down and the energy stored in the inductor Lo decreases accordingly. In the fourth phase, the current slope S of the inductor Lo satisfies the following equation:

$$S=-V_o/L_o \qquad (19)$$

Figure 7:
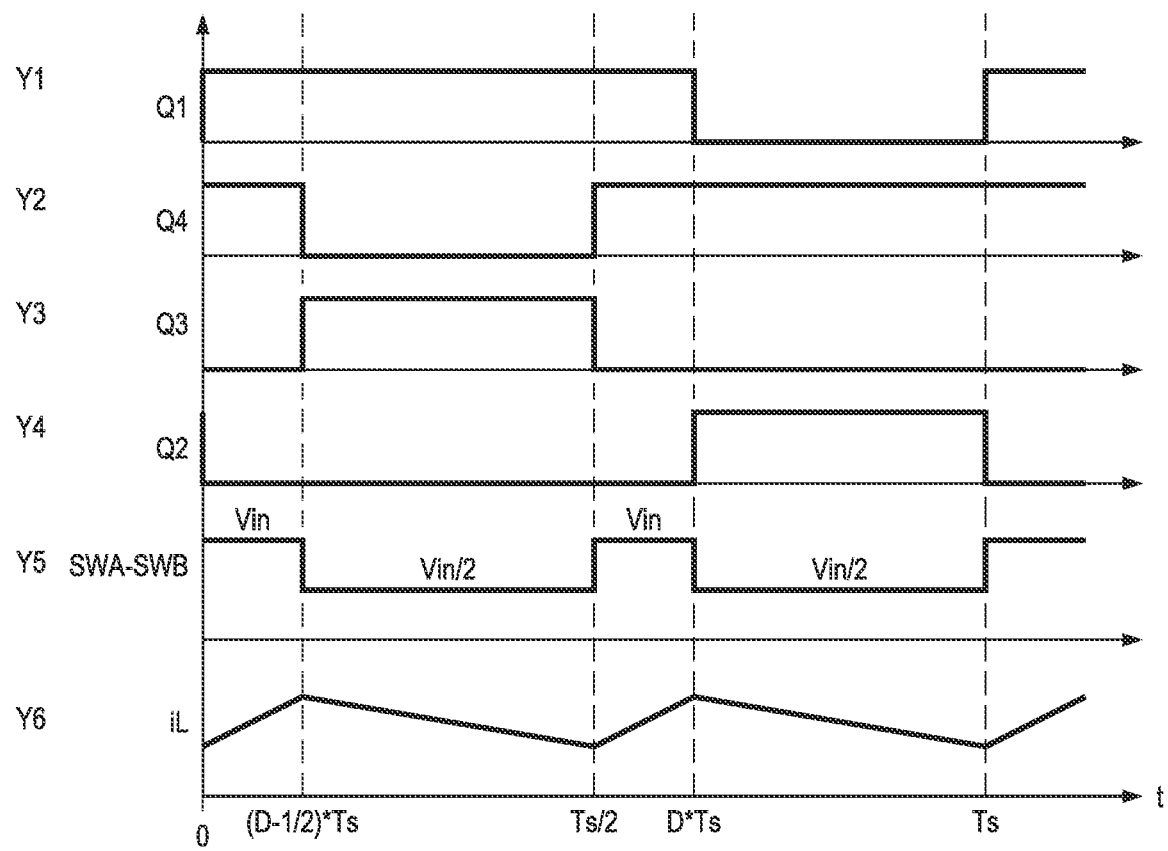
FIG. 7 illustrates a second PWM control timing diagram applied to the second three-level power converter in accordance with various embodiments of the present disclosure.

FIG. 7 illustrates a second PWM control timing diagram applied to the second three-level power converter in accordance with various embodiments of the present disclosure. The horizontal axis of FIG. 7 represents intervals of time. There are six vertical axes. The first vertical axis Y1 represents the gate drive signal of the first switch Q1. The second vertical axis Y2 represents the gate drive signal of the fourth switch Q4. The third vertical axis Y3 represents the gate drive signal of the third switch Q3. The four vertical axis Y4 represents the gate drive signal of the second switch Q2. The fifth vertical axis Y5 represents the voltage difference between SWA and SWB. The sixth vertical axis Y6 represents the current flowing through the inductor Lo.

One switching cycle of the second three-level power converter 200 can be divided into four phases as shown in FIG. 7. A first phase is from 0 to (D·Ts−Ts/2). A second phase is from (D·Ts−Ts/2) to Ts/2. A third phase is from Ts/2 to D·Ts. A fourth phase is from D·Ts to Ts.

As shown in FIG. 7, the duty cycle of the first switch Q1 is equal to the duty cycle of the fourth switch Q4. The duty cycle of the first switch Q1 is in a range from 50% to 100%. In some embodiments, D is equal to a ratio of the output voltage Vo to the input voltage Vin. The gate drive signal of the second switch Q2 is complementary to the gate drive signal of the first switch Q1. The gate drive signal of the third switch Q3 is complementary to the gate drive signal of the fourth switch Q1. As shown in FIG. 7, there is a delay between a leading edge of the gate drive signal of the first switch Q1 and a leading edge of the gate drive signal of the fourth switch Q4. The delay is equal to one half of the switching cycle. Likewise, the delay between a leading edge of the gate drive signal of the third switch Q3 and a leading edge of the gate drive signal of the second switch Q2 is equal to one half of the switching cycle.

During the first phase, switches Q2 and Q3 are turned off. Switches Q1 and Q4 are turned on as shown in FIG. 7. As a result of turning on switches Q1 and Q4, a conductive path is established between Vin and ground. The conductive path is formed by switch Q1, output inductor Lo, output capacitor Co and switch Q4. The current flows from the input power source Vin to ground through the conductive path. The voltage difference between SWA and SWB is equal to Vin as shown in FIG. 7.

During the first phase, the current flowing through the inductor Lo may ramp up and the energy stored in the inductor Lo increases accordingly. The current slope S of the inductor Lo satisfies the following equation:

$$S=(V_{in}-V_o)/L_o \qquad (20)$$

During the second phase, switches Q2 and Q4 are turned off. Switches Q1 and Q3 are turned on as shown in FIG. 7. As a result of turning on switches Q1 and Q3, a conductive path is established between Vin and Vi_mid. The conductive path is formed by switch Q1, output inductor Lo, output capacitor Co and switch Q3. The current flows from the input power source Vin to Vi_mid through the conductive path. The voltage difference between SWA and SWB is equal to Vin/2 as shown in FIG. 7.

During the second phase, the second input capacitor Cin2 is charged, and energy is stored in the second input capacitor Cin2 accordingly. The current flowing through the inductor Lo may ramp up or down depending on the voltage applied across the inductor Lo. In some embodiments, when the input voltage Vin is less than the sum of the voltage across the second input capacitor Cin2 and the output voltage Vo, the current flowing through the inductor Lo ramps down and the energy stored in the inductor Lo reduces accordingly. The current slope S of the inductor Lo satisfies the following equation:

$$S=(V_{in}-V_o-V_{i\_mid})/L_o \qquad (21)$$

During the third phase, switches Q2 and Q3 are turned off. Switches Q1 and Q4 are turned on as shown in FIG. 7. As a result of turning on switches Q1 and Q4, a conductive path is established between Vin and ground. The conductive path is formed by switch Q1, output inductor Lo, output capacitor Co and switch Q4. The current flows from the input power source Vin to ground through the conductive path. The voltage difference between SWA and SWB is equal to Vin as shown in FIG. 7.

During the third phase, the current flowing through the inductor Lo may ramp up and the energy stored in the inductor Lo increases accordingly. The current slope S of the inductor Lo satisfies the following equation:

$$S=(V_{in}-V_o)/L_o \qquad (22)$$

During the fourth phase, switches Q1 and Q3 are turned off. Switches Q2 and Q4 are turned on. As a result of turning on switches Q2 and Q4, a conductive path is established between Vi_mid and ground. The conductive path is formed by switch Q2, output inductor Lo, the output capacitor Co and switch Q4. The voltage difference between SWA and SWB is equal to Vin/2 as shown in FIG. 7.

During the fourth phase, the current discharges the second input capacitor Cin2 and the energy stored in the second input capacitor Cin2 decreases accordingly. In some embodiments, the current flowing through the inductor Lo may ramp down and the energy stored in the inductor Lo decreases accordingly. In the fourth phase, the current slope S of the inductor Lo satisfies the following equation:

$$S=(V_{i\_mid}-V_o)/L_o \qquad (23)$$

In the second three-level power converter 200, it is desirable to maintain a voltage balancing. In particular, the controller is configured 202 to control the operation of the second three-level power converter 200 so as to maintain the voltage on the node Vi_mid equal to one half of the input voltage Vin. Such a voltage balancing helps to keep the second three-level power converter 200 operating efficiently and safely as intended.

In operation, the controller 202 determines the duty cycle of the second three-level power converter 200 through a main feedback control loop. The duty cycle is applied to switch Q1 directly. In order to achieve a capacitor voltage balancing, a duty cycle variation is obtained through a local feedback control loop. The sum of the duty cycle from the main feedback control loop and the duty cycle variation from the local feedback control loop is applied to switch Q4. The duty cycle variation helps to maintain the voltage on the node Vi_mid equal to one half of the input voltage. The detailed operating principle of this capacitor voltage balancing control method will be described below with respect to FIG. 8.

Figure 8:
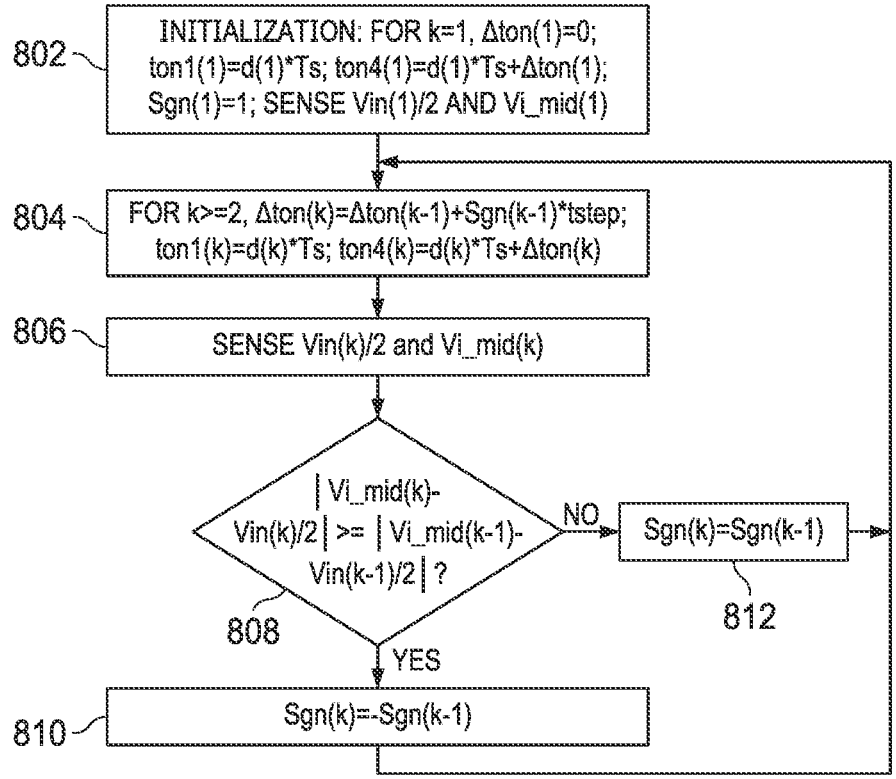
FIG. 8 illustrates a flow chart of a method for controlling the second three-level power converter shown in FIG. 5 in accordance with various embodiments of the present disclosure.

FIG. 8 illustrates a flow chart of a method for controlling the second three-level power converter shown in FIG. 5 in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

In order to achieve a capacitor voltage balancing, a try-and-error based control method is applied to the second three-level power converter shown in FIG. 5. By using the try-and-error based control method, the turn-on time of one switch (e.g., the fourth switch Q4) is dynamically adjusted so as to balance the voltage across the first input capacitor Cin1 and/or the voltage across the second input capacitor Cin2. In other words, the try-and-error based control method is employed to maintain the midpoint voltage Vi_mid equal to one half of the input voltage.

The second three-level power converter 200 is controlled by a main control loop (not shown). The main control loop is configured such that an appropriate duty cycle is determined so as to regulate an output voltage and/or current of the second three-level power converter 200. The try-and-error based control method shown in FIG. 8 functions as a local control loop. The local control loop is configured such that the duty cycle generated by the main control loop is modified based on the voltage on the node Vi_mid. Through modifying the duty cycle, the voltage on the node Vi_mid can be dynamically adjusted so as to achieve a capacitor voltage balancing.

At step 802, an initialization process is applied to the second three-level power converter. As a first step of adjusting the voltage at the node Vi_mid, the controller sets k equal to 1. Δton(1) is equal to zero. Δton(1) is a duty cycle variation in the first step of adjusting the voltage at the node Vi_mid. In the first step, the turn-on time of the first switch Q1 is set to d(1)·Ts, where d(1) is the duty cycle generated by the main control loop, and Ts is a predetermined switch cycle. Also in the first step, the turn-on time of the fourth switch Q4 (ton4(1) shown in FIG. 8) is set to the sum of d(1)·Ts and Δton(1).

In the first step, Sgn(1) is set to 1, where Sgn is a try-and-error direction indicator. Sgn can be set to 1 or −1 depending on whether the unbalanced capacitor voltage has been reduced in the try-and-error based control process. The detailed principle of determining the value of Sgn will be discussed below with respect to Steps 808-812.

In the first step, the controller is configured to detect the input voltage Vin. More particularly, the controller is configured to detect one half of the input voltage (Vin/2) through a suitable divider circuit. The sensed one half of the input voltage in the first step is defined as Vin(1)/2 as shown in FIG. 8. Furthermore, the controller is configured to detect the voltage on the node Vi_mid. The sensed voltage on the node Vi_mid in the first step is defined as Vi_mid(1) as shown in FIG. 8.

At step 804, after finishing the initialization process at step 802, the controller determines the duty cycle variation by the following equation:

$$\Delta ton(k)=\Delta ton(k-1)+Sgn(k-1)\times tstep \quad (24)$$

where k is an integer greater than or equal to 2, and tstep is a predetermined time duration. In some embodiments, tstep is set to 4 nanoseconds.

Also at step 804, the controller determines the duty cycles of the first switch Q1 and the fourth switch Q4 by the following equations:

$$ton1(k)=d(k)\times Ts \quad (25)$$

$$ton4(k)=d(k)\times Ts+\Delta ton(k) \quad (26)$$

where ton1 is the turn-on time of the first switch Q1, ton4 is the turn-on time of the fourth switch Q4.

At step 806, the controller is configured to detect the one half of the input voltage (Vin(k)/2) and the voltage at the node Vi_mid (Vi_mid(k)) again.

At step 808, the controller determines whether the absolute value of the difference between Vin(k)/2 and Vi_mid(k) is greater than or equal to the absolute value of the difference between these two values obtained from the previous step. If the absolute value of the difference between Vin(k)/2 and Vi_mid(k) is greater than or equal to the absolute value of the difference between these two values obtained from the previous step, the method proceeds with step 810 where Sgn(k) is set to a value equal to −1×Sgn(k−1). Otherwise, the method proceeds with step 812 where Sgn(k) is set to a value equal to Sgn(k−1). After determining the value of Sgn at step 810 or 812, the method returns to step 804.

It should be noted that k (k=1, 2, 3, . . . , N−1, N, N+1, . . . ) in the control method shown in FIG. 8 may correspond to one switching cycle, or multiple switching cycles. For example, the control method shown in FIG. 8 may adjust Δton once in every switching cycle, or every other switching cycle.

It should further be noted that the control method used in the flow chart of FIG. 8 only shows the simplest case, where tstep is employed to vary Δton. In some embodiments, tstep is set as a small constant such as 4 nanoseconds. The selection of this constant time step tstep needs to consider both the accuracy and the speed of the capacitor voltage control loop (the local control loop). In addition, a variable time step approach can also be used to accelerate the adjustment speed on Δton, and make the voltage across the input capacitor (e.g., Cin2) to converge faster and closer to Vin/2.

The control method shown in FIG. 8 and are applicable to all three-level power converters where only one voltage needs to be regulated and/or balanced. Furthermore, the control methods are also applicable to applications requiring bidirectional power processing.

It should further be noted that the on-time adjustment of the second switch Q4 is merely an example. A person skilled in the art would understand there may be many alternatives, modifications and variations. For example, the control method may adjust the on-time of Q1 and the on-time of Q4 at the same time. The on-time adjustment step (step 804) can be modified by the following equations:

$$ton1(k)=d(k)\times Ts-\Delta ton(k) \quad (27)$$

$$ton4(k)=d(k)\times Ts+\Delta ton(k) \quad (28)$$

In alternative embodiments, The on-time adjustment step (step 404) can be modified by the following equations:

$$ton1(k)=d(k)\times Ts+\Delta ton(k) \quad (29)$$

$$ton4(k)=d(k)\times Ts-\Delta ton(k) \quad (30)$$

Figure 9:
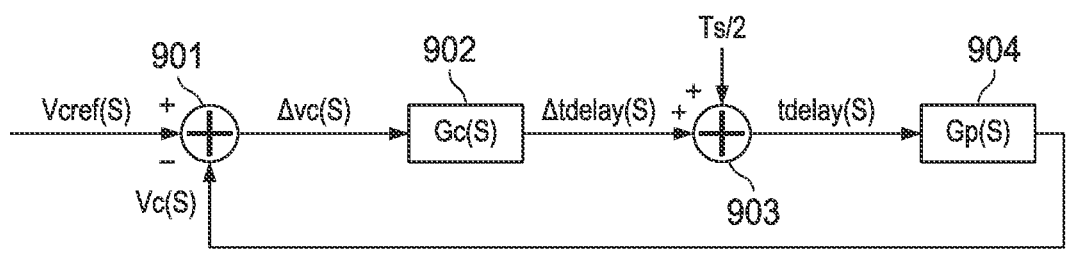
FIG. 9 illustrates a feedback control loop for controlling the capacitor voltage in accordance with various embodiments of the present disclosure.

FIG. 9 illustrates a feedback control loop for controlling the capacitor voltage in accordance with various embodiments of the present disclosure. In some embodiments, a delay time tdelay is used as a control variable to control the capacitor voltage balancing through a negative feedback loop. The delay time tdelay is a phase shift between two gate drive signals. As a phase shift in a three-level power converter, the impact of the delay time tdelay on the capacitor voltage imbalance is always unidirectional and monotonic for any operating conditions and circuit parameters. The unidirectional and monotonic behavior of tdelay is valid even if the three-level power converter operates in different load directions. For example, for a three-level power converter with a flying capacitor, if the delay time tdelay is greater than one half of the switch cycle (Ts/2), and assuming all other circuit parameters are symmetrical, the voltage across the flying capacitor is always greater than Vin/2. This relationship is still valid under a bidirectional power flow.

The feedback control loop shown in FIG. 9 is based on the first three-level power converter shown in FIG. 1. The feedback control loop shown in FIG. 9 comprises a comparison unit 901, a feedback compensation network transfer function 902, a summing unit 903 and a phase-shift to capacitor voltage transfer function 904. As shown in FIG. 9, the comparison unit 901, the feedback compensation network transfer function 902, the summing unit 903 and the phase-shift to capacitor voltage transfer function 904 are connected in cascade.

The signal Vc(S) representing the voltage across the flying capacitor Cb is compared with a flying capacitor reference voltage signal Vcref(S) at the comparison unit 901. The difference between Vcref(S) and Vc(S) is fed into the feedback compensation network transfer function 902. Based on a negative feedback control method, the feedback compensation network transfer function 902 generates a suitable delay Δtdelay(S) for correcting the voltage across the flying capacitor Cb. Since the gate drive signal of the second switch Q2 has a phase shift (180 degrees) from the gate drive signal of the first switch Q1, an appropriate delay (Ts/2) is added into the feedback control loop at the summing unit 903. The summing unit 903 generates a phase shift tdelay(S), which is fed into the phase-shift to capacitor voltage transfer function 904. The phase-shift to capacitor voltage transfer function 904 adjusts the voltage across the flying capacitor Cb based on the received phase shift tdelay(S).

The control method shown in FIG. 9 is applicable to all three-level power converters where only one voltage needs to be regulated and/or balanced. Furthermore, the control method is also applicable to applications requiring bidirectional power processing.

It should be noted the negative feedback loop shown in FIG. 9 is merely an example. A person skilled in the art would understand there may be many alternative, modifications and variations. For example, the negative feedback loop shown in FIG. 9 is also applicable to the second three-level power converter shown in FIG. 5.

Figure 10:
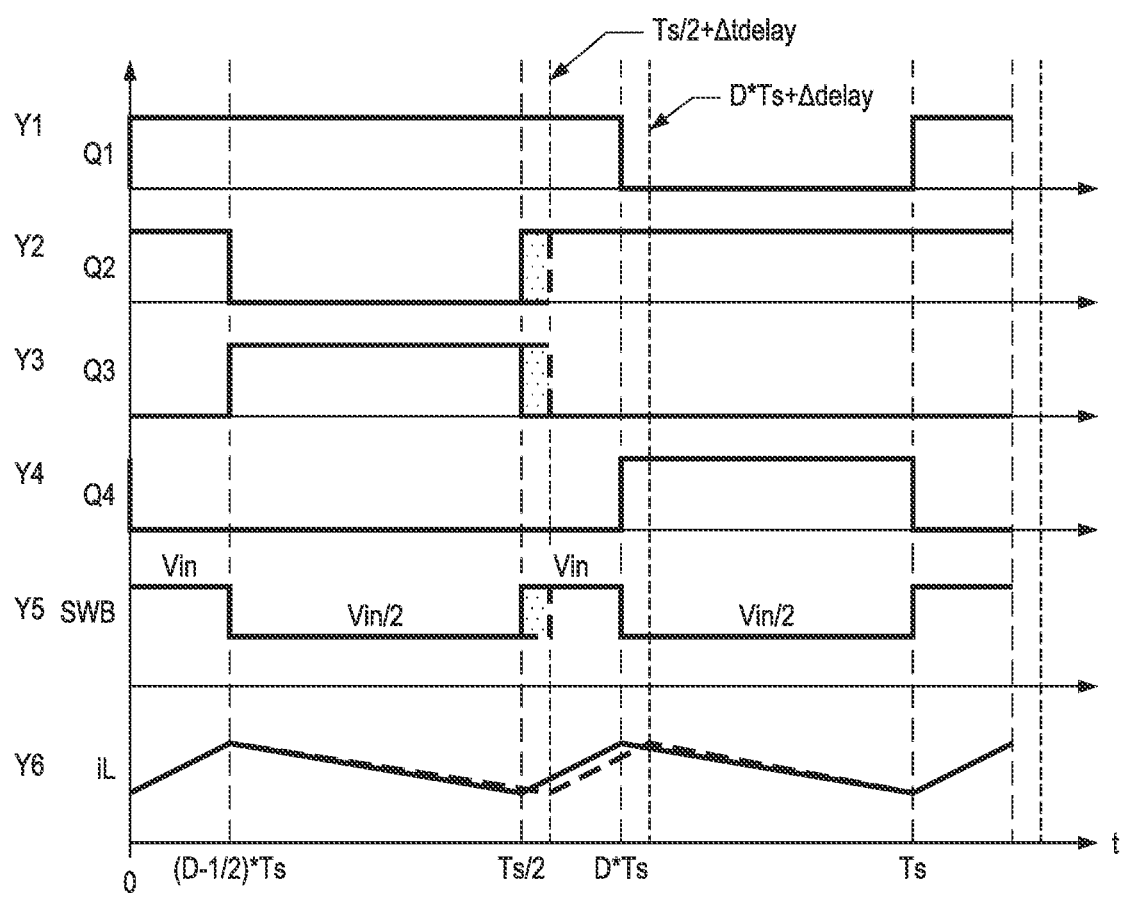
FIG. 10 illustrates a control timing diagram based on the feedback control loop shown in FIG. 9 in accordance with various embodiments of the present disclosure.

FIG. 10 illustrates a control timing diagram based on the feedback control loop shown in FIG. 9 in accordance with various embodiments of the present disclosure. The horizontal axis of FIG. 10 represents intervals of time. There are six vertical axes. The first vertical axis Y1 represents the gate drive signal of the first switch Q1. The second vertical axis Y2 represents the gate drive signal of the second switch Q2. The third vertical axis Y3 represents the gate drive signal of the third switch Q3. The four vertical axis Y4 represents the gate drive signal of the fourth switch Q4. The fifth vertical axis Y5 represents the voltage on the node SWB shown in FIG. 1. The sixth vertical axis Y6 represents the current flowing through the inductor Lo.

One switching cycle of the first three-level power converter 100 can be divided into four phases as shown in FIG. 10. A first phase is from 0 to (D·Ts−Ts/2). A second phase is from (D·Ts−Ts/2) to Ts/2. A third phase is from Ts/2 to D·Ts. A fourth phase is from D·Ts to Ts.

The control timing diagram shown in FIG. 10 similar to that shown in FIG. 3 except that a delay Δtdelay is applied to the gate drive signal of the second switch Q2. The feedback control loop shown in FIG. 9 generates the delay Δtdelay. The delay Δtdelay is applied to the gate drive signal of the second switch Q2. As shown in FIG. 10, the leading edge of the gate drive signal of the second switch Q2 starts at Ts/2+Δtdelay. In contrast, in FIG. 3, the leading edge of the gate drive signal of the second switch Q2 starts at Ts/2. The gate drive signals of Q2 and Q3 are two complementary signals. As a result of applying the delay Δtdelay to the gate drive signal of Q2, the gate drive signal of Q3 is modified accordingly. In response to this delay added into Q2 and Q3, the voltage at the node SWB and the current flowing through the output inductor Lo may vary as shown in FIG. 10.

In comparison with the timing diagram shown in FIG. 3, the charge flowing into the flying capacitor Cb during the first phase is unchanged. However, the discharge current flowing out of the flying capacitor Cb during the modified third phase (from (Ts/2+Δtdelay) to (D×Ts+Δtdelay)) is decreased. Such a reduced discharge current helps to increase the voltage across the flying capacitor Cb. By applying this reduced discharged current to the flying capacitor Cb, the voltage across the flying capacitor is increased to a voltage level greater than one half of the input voltage.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:
1. A method comprising:
  detecting, by a controller, an input voltage to a three-level power converter, wherein the three-level power converter includes a first switch and a second switch;

detecting, by the controller, a voltage signal of the three-level power converter, the voltage signal indicative of a capacitor voltage balancing in the three-level power converter; and dynamically adjusting, by the controller, an operating variable based on the input voltage and the voltage signal to adjust the voltage signal until the capacitor voltage balancing in the three-level power converter satisfies a criteria, the dynamically adjusting comprising:

in an iteration of a plurality of iterations:
determining a duty cycle;
determining a duty cycle variation based on a previous duty cycle variation from a previous iteration of the plurality of iterations, a direction indicator, and a predetermined time duration, the direction indicator being based on a comparison between the capacitor voltage and the criteria; and
configuring the first switch to operate with the duty cycle, and configuring the second switch to operate with a sum of the duty cycle and the duty cycle variation.

2. The method of claim 1, wherein the three-level power converter includes:
the first switch, the second switch, a third switch, and a fourth switch connected in series between an input voltage bus and a ground;
a flying capacitor connected between a common node of the first switch and the second switch, and a common node of the third switch and the fourth switch; and
an output filter connected between a common node of the second switch and the third switch, and the ground.

3. The method of claim 2, wherein the voltage signal is a voltage across the flying capacitor, and the operating variable is the duty cycle of the second switch.

4. The method of claim 2, wherein the operating variable includes an adjustable delay between a gate drive signal of the first switch and a gate drive signal of the second switch, and wherein the adjustable delay is obtained through a negative feedback loop.

5. The method of claim 1, wherein the three-level power converter includes:
the first switch, the second switch, a third switch, and a fourth switch connected in series between an input voltage bus and a ground;
a first input capacitor and a second input capacitor connected in series between the input voltage bus and the ground, a common node of the first input capacitor and the second input capacitor being connected to a common node of the second switch and the third switch; and
an output filter connected between a common node of the first switch and the second switch, and a common node of the third switch and the fourth switch.

6. The method of claim 5, wherein the output filter includes an inductor and a capacitor connected in series between the common node of the first switch and the second switch, and the common node of the third switch and the fourth switch.

7. The method of claim 5, wherein the voltage signal is a voltage at the common node of the second switch and the third switch, and the operating variable is a duty cycle of the fourth switch.

8. The method of claim 5, further comprising:
configuring the fourth switch to operate with the sum of the duty cycle and the duty cycle variation.

9. The method of claim 5, wherein the operating variable includes an adjustable delay placed between a gate drive signal of the first switch and a gate drive signal of the fourth switch, and wherein the adjustable delay is obtained through a negative feedback loop.

10. An apparatus comprising:
a multilevel power converter including a plurality of switches connected in series between an input voltage bus and a ground, the plurality of switches includes a first switch and a second switch; and
a controller configured to:
detect an input voltage on the input voltage bus;
detect a capacitor voltage;
determine a duty cycle;
determine a duty cycle variation based on a previous duty cycle variation from a previous iteration, a direction indicator, and a predetermined time duration, the direction indicator being based on a comparison between the capacitor voltage and a criteria; and
generate gate drive signals based on duty cycle and the duty cycle variation for the plurality of switches, wherein the gate drive signals are dynamically adjusted based on the input voltage and the capacitor voltage to achieve the capacitor voltage balancing in the multilevel power converter.

11. The apparatus of claim 10, wherein the plurality of switches further includes a third switch, and a fourth switch connected in series between the input voltage bus and the ground, and wherein the multilevel power converter includes:
a flying capacitor connected between a common node of the first switch and the second switch, and a common node of the third switch and the fourth switch, the gate drive signals being dynamically adjusted to maintain a voltage across the flying capacitor equal to one half of the input voltage on the input voltage bus; and
a filter connected between a common node of the second switch and the third switch, and the ground.

12. The apparatus of claim 10, wherein the plurality of switches further includes a third switch, and a fourth switch connected in series between the input voltage bus and the ground, and wherein the multilevel power converter includes:
a first input capacitor and a second input capacitor connected in series between the input voltage bus and the ground, a common node of the first input capacitor and the second input capacitor being connected to a common node of the second switch and the third switch, the gate drive signals being dynamically adjusted to maintain a voltage at the common node of the first input capacitor and the second input capacitor equal to one half of the input voltage on the input voltage bus; and
a filter connected between a common node of the first switch and the second switch, and a common node of the third switch and the fourth switch.

13. A method comprising:
detecting, by a controller, an input voltage to a three-level power converter;
detecting, by the controller, a capacitor voltage;
determining, by the controller, a first duty cycle of the three-level power converter; and
based on the first duty cycle, the input voltage, the capacitor voltage, a previous duty cycle variation from a previous iteration, a direction indicator, and a predetermined time duration, determining, by the controller, a second duty cycle of the three-level power converter such that the three-level power converter achieves the capacitor voltage balancing through adjusting the second duty cycle, the direction indicator being based on a comparison between the capacitor voltage and a criteria.

14. The method of claim 13, wherein the three-level power converter includes:
    a first switch, a second switch, a third switch, and a fourth switch connected in series between an input voltage bus and a ground;
    a flying capacitor connected between a common node of the first switch and the second switch, and a common node of the third switch and the fourth switch; and
    a filter connected between a common node of the second switch and the third switch, and the ground.

15. The method of claim 14, further comprising:
    applying the first duty cycle to the first switch, and applying the second duty cycle to the second switch, a voltage across the flying capacitor being dynamically adjusted through adjusting the second duty cycle.

16. The method of claim 14, further comprising:
    dynamically adjusting a voltage across the flying capacitor through applying an adjustable delay placed between a gate drive signal of the first switch and a gate drive signal of the second switch, wherein the adjustable delay is obtained through a negative feedback loop.

17. The method of claim 13, wherein the three-level power converter includes:
    a first switch, a second switch, a third switch, and a fourth switch connected in series between an input voltage bus and a ground;
    a first input capacitor and a second input capacitor connected in series between the input voltage bus and the ground, a common node of the first input capacitor and the second input capacitor being connected to a common node of the second switch and the third switch; and
    a filter connected between a common node of the first switch and the second switch, and a common node of the third switch and the fourth switch.

18. The method of claim 17, further comprising:
    applying the first duty cycle to the first switch, and applying the second duty cycle to the fourth switch, a voltage on the common node of the first input capacitor and the second input capacitor being dynamically adjusted through adjusting the second duty cycle.

19. The method of claim 17, further comprising:
    dynamically adjusting a voltage on a common node of the first input capacitor and the second input capacitor through applying an adjustable delay placed between a gate drive signal of the first switch and a gate drive signal of the fourth switch, wherein the adjustable delay is obtained through a negative feedback loop.

20. The method of claim 1, further comprising:
    repeatedly performing the detecting the input voltage, the detecting the voltage signal, and the dynamically adjusting the operating variable in multiple iterations until the capacitor voltage balancing in the three-level power converter satisfies the criteria.

* * * * *

UNITED STATES PATENT AND TRADEMARK OFFICE
CERTIFICATE OF CORRECTION

PATENT NO. : 12,218,608 B2
APPLICATION NO. : 17/685702
DATED : February 4, 2025
INVENTOR(S) : Ye et al.

Page 1 of 1

It is certified that error appears in the above-identified patent and that said Letters Patent is hereby corrected as shown below:

In the Claims

In Column 21, in Claim 3, Line 36, after "cycle" delete "of the second switch".

Signed and Sealed this
Eighteenth Day of March, 2025

Coke Morgan Stewart
*Acting Director of the United States Patent and Trademark Office*